United States Patent
Park et al.

(10) Patent No.: US 11,634,849 B2
(45) Date of Patent: Apr. 25, 2023

(54) HOME APPLIANCE AND METHOD FOR CONTROLLING HOME APPLIANCE

(71) Applicant: LG ELECTRONICS INC., Seoul (KR)

(72) Inventors: Yun Sik Park, Seoul (KR); Dayun Han, Seoul (KR); Sung Mok Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 443 days.

(21) Appl. No.: 16/803,597

(22) Filed: Feb. 27, 2020

(65) Prior Publication Data

US 2021/0148034 A1    May 20, 2021

(30) Foreign Application Priority Data

Nov. 15, 2019    (KR) .................. 10-2019-0147078

(51) Int. Cl.
   *D06F 34/18*       (2020.01)
   *D06F 34/20*       (2020.01)
   (Continued)

(52) U.S. Cl.
   CPC ............. *D06F 34/18* (2020.02); *D06F 33/34* (2020.02); *D06F 33/37* (2020.02); *D06F 33/52* (2020.02); *D06F 33/54* (2020.02); *D06F 33/57* (2020.02); *D06F 34/20* (2020.02); *G05B 19/042* (2013.01); *G06F 18/214* (2023.01); *G06N 3/08* (2013.01); *G06T 7/62* (2017.01); *G06V 10/255* (2022.01); *G06V 10/764* (2022.01); *G06V 10/774* (2022.01); *G06V 20/00* (2022.01); *G06V 20/52* (2022.01); *H04N 23/54* (2023.01); *A47L 15/4295* (2013.01); *D06F 58/34* (2020.02); *D06F 2103/04* (2020.02);
   (Continued)

(58) Field of Classification Search
   CPC .......... D06F 33/32; D06F 33/34; D06F 33/37; D06F 33/52; D06F 33/54; D06F 33/57; D06F 58/34; D06F 2103/04; D06F 2103/40; D06F 2105/02; D06F 2105/42; A47L 15/4295
   See application file for complete search history.

(56) References Cited

U.S. PATENT DOCUMENTS 5,241,845 A  *  9/1993  Ishibashi ............. G05B 19/042
                                               68/12.02
10,215,491 B2 *  2/2019  Ashrafzadeh ........... D06F 33/00
(Continued)

*Primary Examiner* — Joseph L. Perrin
(74) *Attorney, Agent, or Firm* — Birch, Stewart, Kolasch & Birch, LLP

(57) ABSTRACT

A home appliance and a control method for the home appliance, which is operable in an IoT environment through a 5G communication network and uses a neural network model generated according to machine learning is provided. The home appliance may include a home appliance main body; a container mounted within the home appliance main body to accommodate a treatment target; a camera arranged to photograph the inside of the container; and one or more processors configured to control an operation of the home appliance, wherein the processor is configured to determine an amount of a treatment target based on feature shapes of the container identified in an image of the inside of the container photographed by the camera.

9 Claims, 8 Drawing Sheets

(51) Int. Cl.

| | |
|---|---|
| *D06F 33/57* | (2020.01) |
| *D06F 33/54* | (2020.01) |
| *D06F 33/52* | (2020.01) |
| *D06F 33/34* | (2020.01) |
| *D06F 33/37* | (2020.01) |
| *D06F 103/04* | (2020.01) |
| *D06F 105/02* | (2020.01) |
| *D06F 103/40* | (2020.01) |
| *G06T 7/62* | (2017.01) |
| *G06N 3/08* | (2023.01) |
| *G05B 19/042* | (2006.01) |
| *G06V 20/00* | (2022.01) |
| *G06F 18/214* | (2023.01) |
| *H04N 23/54* | (2023.01) |
| *G06V 10/764* | (2022.01) |
| *G06V 10/774* | (2022.01) |
| *G06V 10/20* | (2022.01) |
| *G06V 20/52* | (2022.01) |
| *D06F 105/42* | (2020.01) |
| *A47L 15/42* | (2006.01) |
| *D06F 58/34* | (2020.01) |

(52) U.S. Cl.
CPC ...... *D06F 2103/40* (2020.02); *D06F 2105/02* (2020.02); *D06F 2105/42* (2020.02); *G05B 2219/23238* (2013.01); *G06T 2207/20081* (2013.01); *G06T 2207/20084* (2013.01)

(56) References Cited

U.S. PATENT DOCUMENTS

| | | | |
|---|---|---|---|
| 2014/0060121 A1* | 3/2014 | Burger | D06F 58/203 68/17 R |
| 2014/0182068 A1* | 7/2014 | Balinski | D06F 33/32 68/12.04 |
| 2016/0222577 A1* | 8/2016 | Ashrafzadeh | D06F 34/18 |
| 2017/0009390 A1* | 1/2017 | Suh | D06F 34/18 |
| 2018/0127910 A1* | 5/2018 | Xu | D06F 33/36 |
| 2019/0169780 A1* | 6/2019 | Chen | D06F 34/18 |
| 2020/0024792 A1* | 1/2020 | Lee | G06N 3/08 |
| 2021/0093154 A1* | 4/2021 | Boyer | A47L 15/449 |
| 2021/0360752 A1* | 11/2021 | Parhar | G06F 9/5072 |
| 2022/0095882 A1* | 3/2022 | Kara | A47L 15/4409 |

* cited by examiner

HOME APPLIANCE AND METHOD FOR CONTROLLING HOME APPLIANCE

CROSS-REFERENCE TO RELATED APPLICATION

This present application claims the benefit of priority to Korean Patent Application No. 10-2019-0147078, entitled "HOME APPLIANCE AND METHOD FOR CONTROLLING HOME APPLIANCE," filed on Nov. 15, 2019, in the Korean Intellectual Property Office, the entire disclosure of which is incorporated herein by reference.

BACKGROUND

1. Technical Field

The present disclosure relates to a home appliance for treating an object using a camera configured to photograph the inside of a container, and a method for controlling the home appliance.

2. Description of Related Art

A home appliance for treating an object accommodates the object in the home appliance, and performs an operation for treating the object according to a user's purpose through water, air, vibration, rotation, and heating.

For example, a home appliance of which the purpose for treating an object is washing may include a washing machine, a dryer, a dishwasher, a clothing manager, and the like, and the home appliance for such washing needs to accurately determine the amount of laundry, clothes, or dishes accommodated.

As another example, a home appliance for cooking may include a microwave oven, an oven, an air fryer, and the like, and the home appliance for such cooking needs to accurately determine the amount of food ingredients accommodated.

In the case of a washing machine and a dryer, a technique for detecting a weight of a laundry using a weight sensor has been disclosed, but for other home appliances, a user needs to determine the amount of an accommodated object. However, there is an issue in that such a determination may not be accurate.

In addition, there is an issue in that the washing machine and dryer are unable to detect the volume of an accommodated object.

Moreover, a home appliance that treats an object needs to measure the amount of the accommodated object and grasp the attributes of the object in order to treat the accommodated object as desired.

Accordingly, there is a need for a method and apparatus for automatically determining the amount of an object in a home appliance that treats the object.

The above-described related art is technical information that the inventor holds for deriving the present disclosure or is acquired in the derivation process of the present disclosure, and is not necessarily a known technology disclosed to the general public before the application of the present disclosure.

SUMMARY OF THE INVENTION

An aspect of the present disclosure is to address an issue associated with some related art in which a home appliance for treating an object is unable to accurately grasp an amount or an attribute of an object, and is thus unable to effectively perform a desired treatment.

Another aspect of the present disclosure is to address an issue associated with some related art in which a home appliance for treating an object measures the weight of the object but is unable to measure the volume of the object, and is thus unable to accurately understand the properties of the object and performs the wrong treatment.

Another aspect of the present disclosure is to address an issue associated with some related art in which, when determining an object treatment method based on only the weight of an object, a home appliance for treating an object is unable to grasp the properties of the object and properly treat the object.

Another aspect of the present disclosure is to address an issue associated with some related art in which, when attempting to recognize an object itself in order to determine the volume of the object, the object cannot be separated from a background, and the recognition accuracy of the object becomes low.

A home appliance or a method for controlling a home appliance according to an embodiment of the present disclosure recognizes characteristic shapes in an interior space in which a target to be treated is accommodated, and estimates an amount of a target to be treated based on characteristic shapes that are not covered by the target to be treated.

In addition, a home appliance or a method for controlling a home appliance according to an embodiment of the present disclosure determines the amount of a target to be treated by comparing the characteristic features seen in the interior space which is empty before the treatment target is accommodated and the characteristic features seen in the interior space after the treatment target is accommodated.

In addition, a home appliance or a method for controlling a home appliance according to an embodiment of the present disclosure determines the amount of a treatment target accommodated in the interior space by applying a neural network model that is pre-trained with images of the interior space accommodating the treatment target.

A home appliance according to an embodiment of the present disclosure may include a home appliance main body, a container mounted within the home appliance main body to accommodate a treatment target, a camera arranged to photograph the inside of the container, and one or more processors configured to control an operation of the home appliance.

Herein, the processor may be configured to determine an amount of a treatment target based on feature shapes within the container identified in an image of the inside of the container photographed by the camera.

Herein, the feature shapes may include a plurality of shapes having a first form, and an operation of determining an amount of a treatment target based on the feature shapes inside the container may include an operation of determining an amount of a treatment target based on the number of shapes of the first form identified in the image of the inside of the container photographed by the camera.

The home appliance may further include a lighting disposed to illuminate the inside of the container, and a door configured to open and close a treatment target inlet of the container. The camera may be disposed in the door.

Herein, the operation of determining the amount of the treatment target based on the feature shapes inside the container may include operations of extracting the feature shapes from the image of the inside of the container before the treatment target is put in, correlating the amount of the treatment target with hidden (or blocked) or visible feature shapes, and determining the amount of the treatment target based on blocked feature shapes or visible feature shapes in the image of the inside of the container after the treatment target is put in.

The home appliance may further include a memory connected to the processor, wherein the memory may store a neural network model that is pre-trained to determine the amount of a treatment target based on feature shapes inside the container.

Herein, the neural network model may be a neural network model that is trained using training data including images of the inside of the container into which various amounts of a treatment target is put and labels indicating the amount of the treatment target for each image.

In more detail, the neural network model may be configured to determine the amount of the treatment target using the number of blocked feature shapes or visible feature shapes of the container among the feature shapes in the container before the treatment target is put in (visible feature shapes in the empty container).

The home appliance may further include a weight sensor configured to detect the weight of the treatment target in the container, and the amount of the treatment target is the volume of the treatment target. The processor may be further configured to determine the density of the treatment target, based on the volume of the treatment target determined based on the feature shapes inside the container and the weight of the treatment target sensed by the weight sensor.

Herein, the processor may be configured to determine a type of the treatment target based on the density of the treatment target and an image of the treatment target photographed by the camera, and select a treatment mode based on the type of the treatment target.

A method for controlling a home appliance according to an embodiment of the present disclosure may include photographing the inside of a container of a home appliance after a treatment target is put in, and determining the amount of the treatment target based on feature shapes inside the container identified in the photographed image of the inside of the container.

In the method for controlling a home appliance according to this embodiment of the present disclosure, the photographing of the inside of the container may include, before determining an operation cycle of the home appliance, detecting opening of a door of the home appliance and closing of the door after a predetermined time, illuminating the inside of the container with lighting after the door is closed, and photographing the inside of the container through a camera disposed in the door of the home appliance while the inside of the container is illuminated with the lighting.

A computer-readable recording medium for controlling a home appliance according to an embodiment of the present disclosure may be a computer-readable recording medium in which a computer program configured to execute any one of the above-described methods is stored.

In addition, a non-transitory computer readable medium in which computer executable code for controlling a home appliance is stored may include code configured to cause a camera to photograph the inside of a container of the home appliance after a treatment target is put in, and code configured to cause a processor to determine an amount of a treatment target based on feature shapes within the container identified in a photographed image of the inside of the container.

Other aspects and features in addition as those described above will become clear from the accompanying drawings, claims, and the detailed description of the present disclosure.

Embodiments of the present disclosure enable a home appliance for treating an object to accurately grasp an amount or an attribute of an object, such that a user can effectively perform a desired treatment.

In addition, the embodiments of the present disclosure enable a home appliance for treating an object to accurately measure the amount of the object and accurately understand the attributes of the object, such that an appropriate treatment for the treatment target can be performed.

In addition, the embodiments of the present disclosure enable a home appliance for treating an object to grasp the volume of the object as well as the weight of the object, such that the home appliance for treating the object can identify the characteristics of the treatment target and perform appropriate treatment accordingly.

In addition, the embodiments of the present disclosure do not require separation of the object and the background in order to determine the volume of the object. Accordingly, the home appliance for treating the object can more accurately determine the volume of the treatment target.

In addition, the embodiments of the present disclosure do not require a process of separating the object and the background, and use an indirect method of estimating the volume of the object. Accordingly, volume determination of treatment targets can be made simpler and more accurate.

The effects of the present disclosure are not limited to those mentioned above, and other effects not mentioned can be clearly understood by those skilled in the art from the following description.

DETAILED DESCRIPTION

Figure 1:
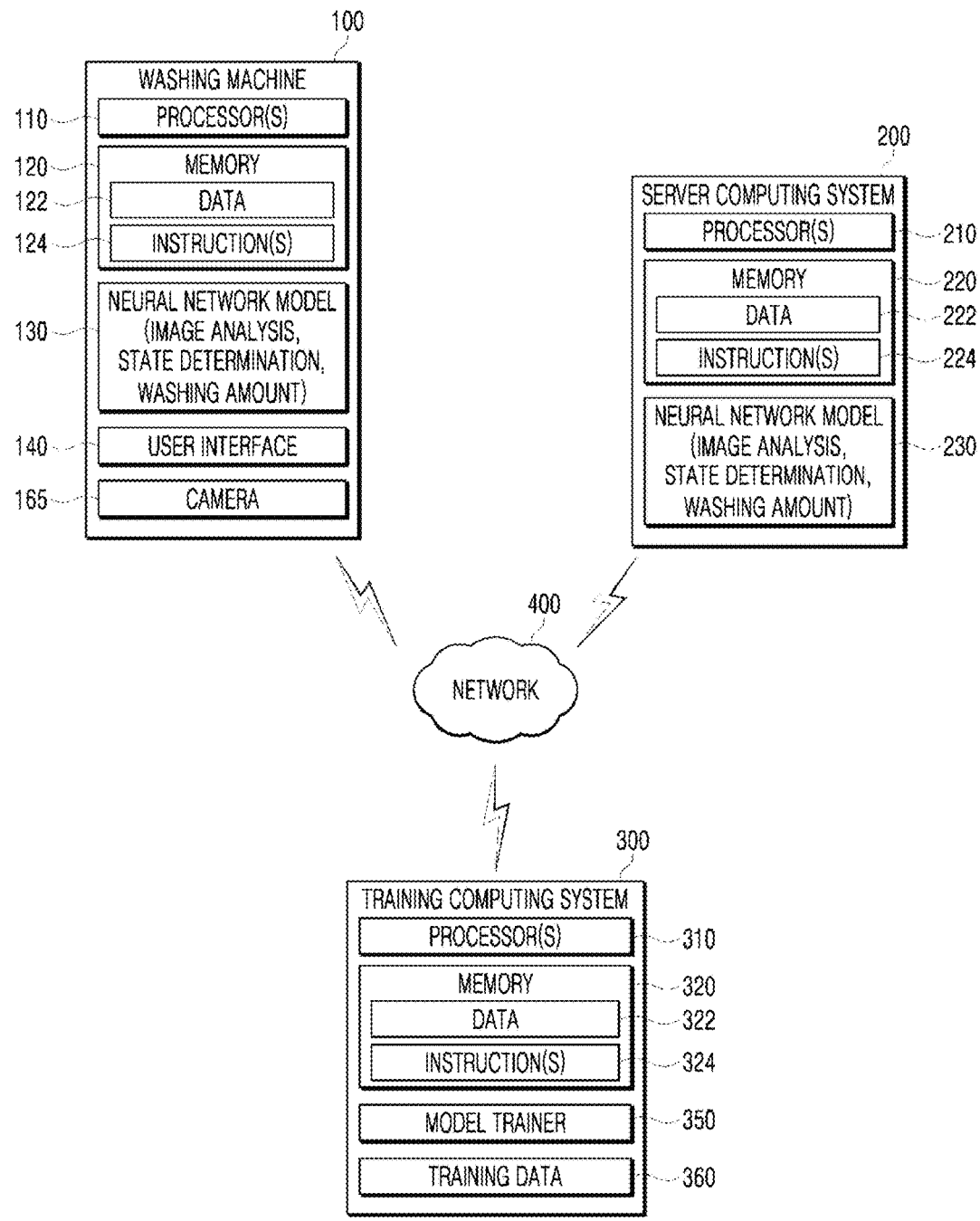
FIG. 1 is an exemplary diagram of an environment in which a washing machine as an example of a home appliance operates, according to an embodiment of the present disclosure.

The advantages and features of the present disclosure and methods to achieve them will be apparent from the embodiments described below in detail in conjunction with the accompanying drawings. However, the description of particular exemplary embodiments is not intended to limit the present disclosure to the particular exemplary embodiments disclosed herein, but on the contrary, it should be understood that the present disclosure is to cover all modifications, equivalents and alternatives falling within the spirit and scope of the present disclosure. The embodiments disclosed below are provided so that this disclosure will be thorough and complete and will fully convey the scope of the present disclosure to those skilled in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. It must be noted that as used herein and in the appended claims, the singular forms "a," "an," and "the" include the plural references unless the context clearly dictates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or a combination thereof. Furthermore, these terms such as "first," "second," and other numerical terms, are used only to distinguish one element from another element. These terms are generally only used to distinguish one element from another.

Hereinafter, embodiments of the present disclosure will be described in detail with reference to the accompanying drawings. Like reference numerals designate like elements throughout the specification, and overlapping descriptions of the elements will be omitted.

A home appliance according to the embodiment of the present disclosure may include any home appliance that performs a series of operations after an object is put into the device, for example, a washing machine, a dryer, a dishwasher, an oven, a microwave an oven, a clothing manager, and the like. However, hereinafter, for convenience of description, embodiments of the present disclosure will be described by using a washing machine as an example.

Furthermore, a washing apparatus may include a washing machine for washing clothes, a dryer for drying clothes, a washing and drying machine capable of both washing and drying clothes, and a dishwasher for washing dishes. Embodiments of the present disclosure may be applied to the above-mentioned devices for the same purpose.

Hereinafter, as an example of a home appliance, embodiments of the present disclosure will be described by using a washing machine, and more specifically, a drum washing machine, as an example.

FIG. 1 is an exemplary diagram of an environment in which a washing machine as an example of a home appliance operates, according to an embodiment of the present disclosure.

The environment for performing a method for controlling a home appliance according to an embodiment of the present disclosure may include a washing machine 100 (which is a home appliance), a server computing system 200, a training computing system 300, and a network 400 that enables these components to communicate with each other.

The washing machine 100 can support object-to-object intelligent communication (such as Internet of things (IoT), Internet of everything (IoE), and Internet of small things (IoST)), and can also support communication such as machine to machine (M2M) communication and device to device (D2D) communication.

The washing machine 100 may determine an image resolution enhancement method by using big data, artificial intelligence (AI) algorithms, or machine learning algorithms in a 5G environment connected for the IoT.

The washing machine 100 may include, for example, one or more processors 110 and a memory 120.

The one or more processors 110 may include any type of device capable of processing data, such as an MCU. Here, the 'processor' may refer to a data processing device embedded in hardware, which has, for example, a circuit physically structured to perform a function represented by codes or instructions included in a program.

Examples of the hardware-embedded data processing device may include a processing device, such as a microprocessor, a central processing unit (CPU), a processor core, a multiprocessor, an application-specific integrated circuit (ASIC), and a field programmable gate array (FPGA). However, the scope of the present disclosure is not limited thereto.

The memory 120 may include one or more non-transitory storage media, such as RAM, ROM, EEPROM, EPROM, flash memory devices, and magnetic disks. The memory 120 may store instructions 124 that cause the washing machine 100 to perform operations when executed by data 122 and processors 110.

In addition, the washing machine 100 may include a user interface 140 to receive commands from a user and to transmit output information to the user. The user interface 140 may include various input tools, such as a keyboard, a mouse, a touch screen, a microphone, and a camera; and various output tools, such as a monitor, a speaker, and a display.

The user may select an area of an image to be processed in the washing machine 100 through the user interface 140. For example, the user may select, through the mouse, the keyboard, the touch screen, or the like, an object or area in a low resolution image of which the user wants to improve the resolution. In addition, the user may generate a command to reduce or enlarge the image by performing a pinch-in or pinch-out operation on the touch screen.

In one embodiment, the washing machine 100 may also store or include a neural network model 130, such as an image analysis model, a home appliance state determination model, a natural language processing model, to which artificial intelligence technology is applied. For example, the neural network model 130 to which the artificial intelligence technology is applied may be various learning models, such as a convolutional neural network, a generative adversarial network, or other types of machine learning models.

Artificial intelligence (AI) is an area of computer engineering science and information technology that studies methods to make computers mimic intelligent human behaviors such as reasoning, learning, self-improving, and the like.

In addition, the artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

Specifically, machine learning may be a technology for researching and constructing a system for learning, predicting, and improving its own performance based on empirical data and an algorithm for the same. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

An ANN is a data processing system modeled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms "artificial neural network" and "neural network" may be used interchangeably herein.

An ANN may include a number of layers, each including a number of neurons. Furthermore, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a lower layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

In this specification, the term 'layer' can be used interchangeably with the term 'level'.

An ANN may be classified as a single-layer neural network or a multi-layer neural network, based on the number of layers therein.

A general single-layer neural network is composed of an input layer and an output layer.

In addition, a general multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be the most representative type of artificial neural network which enables deep learning, which is one machine learning technique.

An ANN may be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An ANN trained using training data can classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms of an ANN may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regression, and a function that predicts and outputs the class of an input vector may be referred to as a classifier.

In supervised learning, an artificial neural network may be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

In addition, throughout the present specification, assigning one or more labels to training data in order to train an artificial neural network may be referred to as labeling the training data with labeling data.

Training data and labels corresponding to the training data together may form a single training set, and as such, they may be input to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

In this specification, the term 'grouping' can be used interchangeably with the term 'clustering'.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One of semi-supervised learning techniques involves guessing the label of unlabeled training data, and then using this guessed label for learning. This technique may be used advantageously when the cost associated with the labeling process is high.

Reinforcement learning may be based on a theory that given the condition under which a reinforcement learning agent may determine what action to choose at each time instance, the agent may find an optimal path to a solution solely based on experience without reference to data.

Reinforcement learning may be performed mainly through a Markov decision process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size. In SGD, a momentum and Nesterov accelerate gradient (NAG) are methods for increasing optimization accuracy by adjusting a step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

The neural network models 130 to which the above-mentioned artificial intelligence technology is applied may be first generated through a training step by the training computing system 300, and may be stored in the server computing system 200 and then transmitted to the washing machine 100 via the network 400.

The neural network model 130 may be a learning model that is trained to analyze an image inside a container or a washing tank of the washing machine 100, a learning model that is trained to determine the operating state of the washing machine 100, or a model that is trained to determine a laundry amount, such as a volume of laundry. Here, the training method may be performed using supervised learning and non-supervised learning.

Typically, the neural network model 130 may be stored in the washing machine 100 in a state in which, having completed the training step in the training computing system 300, the neural network model 130 can be applied during the operation of the washing machine 100. However, in some embodiments, the neural network model 130 may be updated or upgraded through additional training in the washing machine 100.

Meanwhile, the neural network model 130 stored in the washing machine 100 may be some of models generated by the training computing system 300. If necessary, new neural network models may be generated in the training computing system 300 and transferred to the washing machine 100.

As another example, the neural network models may be stored in the server computing system 200 instead of being stored in the washing machine 100, and may provide necessary functions to the washing machine 100 in the form of a web service.

The server computing system 200 includes processors 210 and a memory 220, and may have greater processing capacity and larger memory capacity than the washing machine 100, which is a home appliance generally used in homes. Thus, depending on the system implementation, a heavy neural network model 230, which requires more processing power for application, may be configured to be stored in the server computing system 200, and a lightweight neural network model 130, which requires less processing power for application, may be configured to be stored in the washing machine 100.

The washing machine 100 may select an appropriate neural network model according to a processing target among various neural network models.

In one example, when it is necessary to determine the amount of laundry put into the washing tank, the washing machine 100 may select a neural network model that is trained to determine the laundry amount by analyzing an image of the inside of the washing tank acquired through the camera.

This neural network model is based on CNN, and may be a neural network model that is trained via a supervised learning method using, as training data, images of a plurality of washing tanks containing various amounts of laundry, in which each of the images are labeled with the amount of laundry.

In another example, when it is necessary to determine the operating state of the washing machine 100, the washing machine 100 may select a neural network model that is trained to determine the state of the washing machine by analyzing operating parameters of the washing machine 100.

The neural network models 130 and 230 included in the washing machine 100 or the server computing system 200 may be neural network models generated by the training computing system 300.

The training computing system 300 may include one or more processors 310 and a memory 320. In addition, the training computing system 300 may include a model trainer 350 and training data 360 for training machine learning models.

The training computing system 300 may create a plurality of neural network models based on the training data 360 using the model trainer 350.

Figure 2:
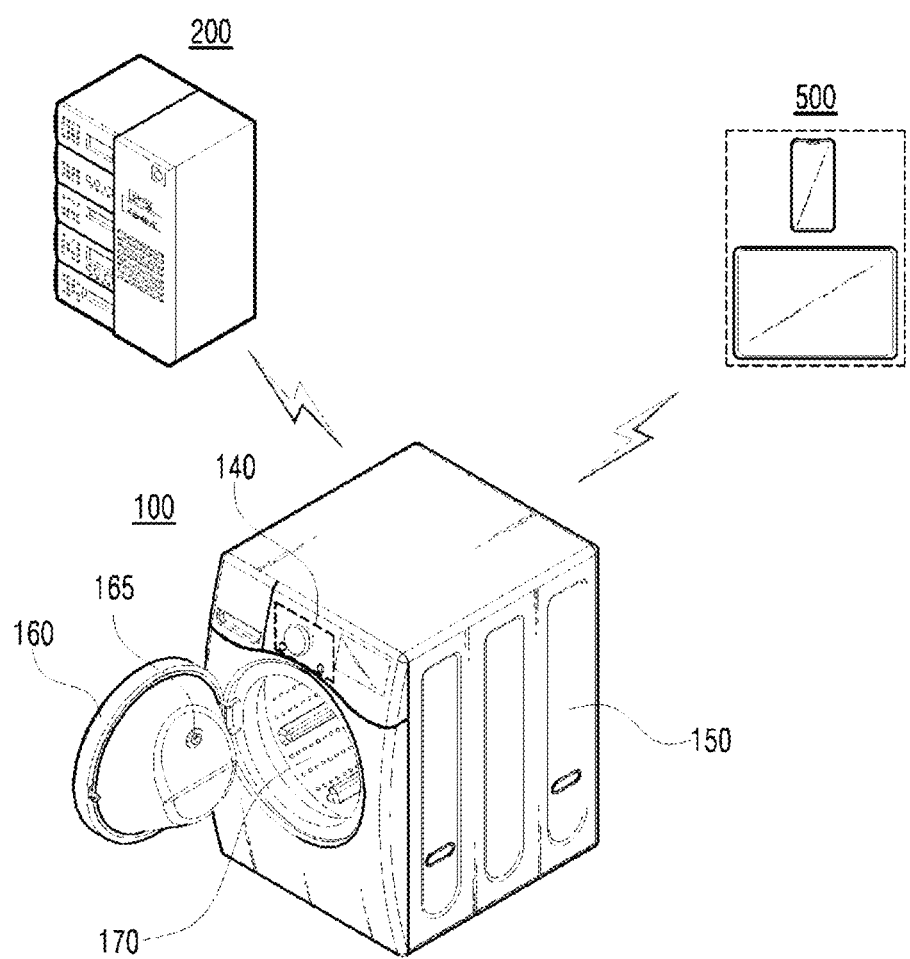
FIG. 2 is a diagram illustrating an environment in which a washing machine, as an example of a home appliance, communicates with an external server and a user terminal, according to an embodiment of the present disclosure.

FIG. 2 is a diagram illustrating an environment in which a washing machine, as an example of a home appliance, communicates with an external server and a user terminal, according to an embodiment of the present disclosure.

The washing machine 100 may include a user interface 140 for enabling user interaction with the washing machine 100, a main body 150 forming the exterior of the washing machine 100, a washing tank 170 for storing laundry, a door 160 installed to open and close a passage through which an object (for example, a treatment target) is introduced into the washing tank 170, and a camera 165 disposed in the door 160 to photograph the container or washing tank 170 of the washing machine 100.

The user interface 140 may include a jog shuttle for determining one of preset laundry courses, a button for adjusting the time or number of times, a display for visually providing laundry-related information, a speaker for acoustically outputting laundry-related information, and a microphone for collecting external voice.

The user may transmit a command to the washing machine 100 through the user interface 140, and the washing machine 100 may also transmit information to the user through the user interface 140.

The main body 150 is a case forming the exterior of the washing machine 100, and the main body 150 may include, for example, a washing tank (for example, an outer tub and an inner tub), which is a container for storing laundry, a motor for rotating the washing tank, one or more processors for controlling a washing operation, and a memory connected to the processor.

The object put into the main body 150 may be a treatment target put into a washing tank in the main body 150, and an opening part through which a treatment target can be put into a washing tank in the main body 150 may be formed in a portion of the main body 150.

The door 160 for opening and closing a passage through which an object is put in through an opening part of the main body 150 may be rotatably disposed in the washing machine 100. The camera 165 capable of photographing the inside of the washing tank 170 may be disposed inside the door 160.

The camera 165 may be disposed to face the inside rather than the outside of the washing machine 100, and may photograph the washing tank 170 containing the laundry. The camera 165 may be selected from various types of cameras, such as a 2D camera, a 3D camera, a stereo camera, and an infrared camera.

Moreover, although not shown in FIG. 2, the washing machine 100 may include a lighting disposed to illuminate the inside of the washing tank 170, which is a container. The lighting is turned on when the door 160 is closed after the laundry is put in, so that the image inside the washing tank 170 can be photographed more clearly.

Moreover, the washing machine 100 may further include a weight sensor that can detect the weight of the laundry contained in the washing tank 170. The weight sensor may be a load sensor for measuring a change in weight of the washing tank 170, and may refer to a component configured to estimate the weight by measuring the torque force required to rotate the washing tank 170 after the laundry is put in.

The processor may determine the density of the laundry by using the volume of the laundry determined based on the weight of the laundry detected by the weight sensor and the feature shapes inside the washing tank 170.

The density is important attribute information of the laundry that is the treatment target. The processor can subsequently determine a washing mode based on the attribute information.

For example, if the volume of the laundry is large but light, the processor of the washing machine 100 may determine the laundry having a density lower than a predetermined value as a duvet, and select a washing mode suitable for duvet washing.

In this case, the washing machine 100 may transmit to a user terminal 500 information regarding the inputted laundry having been determined as a duvet and/or the washing mode having been selected as duvet washing, and may be configured to receive user feedback thereon.

Furthermore, the determination of the type of laundry can become more sophisticated by using an object recognition model in addition to the above-described method. In addition to the laundry density estimated in the above-described manner, the type of laundry may be more accurately determined through object recognition of the laundry image photographed by the camera 165.

For example, if the density of the laundry is high, and the color of the laundry based on the image photographed by the camera 165 is blue and the type is estimated to be pants, the laundry estimation algorithm may estimate that the laundry is jeans.

As another example, when using object identification technology through photographed images in the case where the laundry density is low, determination of whether laundry with low density is a padded jacket or a duvet can be made more accurately.

Accordingly, the washing machine 100 may transmit to the user terminal 500 information regarding the inputted laundry having been determined as a leather jumper and/or the washing mode having been selected as leather washing, and may receive user feedback thereon.

Although not shown in FIG. 2, the washing machine 100 may include one or more processors, a memory connected to the processor, and a communication interface.

The washing machine 100 may communicate with the external server 200 through a communication interface. The washing machine 100 may receive support from the external server 200 in recognizing feature shapes in an image, determining an amount (for example, volume) of laundry through image analysis, and determining a state of the washing machine 100.

The washing machine 100 may communicate with the user terminal 500 through a communication interface. The washing machine 100 may transmit to the user terminal 500 a notification on an event occurring during the washing process, and may receive an instruction on the washing machine operation from the user terminal 500.

In addition, the washing machine 100 may transmit to the user terminal 500 an image of the inside of the washing tank 170 photographed by the camera 165, and/or the information on the amount of laundry determined by analyzing the image and the washing mode determined according to the determined amount of laundry. The user may evaluate the determination of the washing machine 100 through the user terminal 500 and transmit a signal for adjusting the determination of the washing machine 100 to the washing machine 100.

For example, the washing machine 100 may determine that the amount of laundry is a small amount by analyzing the image of the inside of the washing tank 170 photographed by the camera 165, and select a washing mode required when the laundry is a small amount. In addition, the washing machine 100 may transmit the determination and the selection to the user terminal 500 through the communication interface.

The user may check an image of the inside of the washing tank 170 photographed by the washing machine 100 and/or the determination of the washing amount of the washing machine 100 through the display of the user terminal 500.

If the user recognizes that the washing amount determination of the washing machine 100 is wrong, the user may transmit a signal for correcting the washing amount determination to the washing machine 100 through the user terminal 500, and in response to this signal, the washing machine 100 may update the washing amount determination model.

Figure 3A:
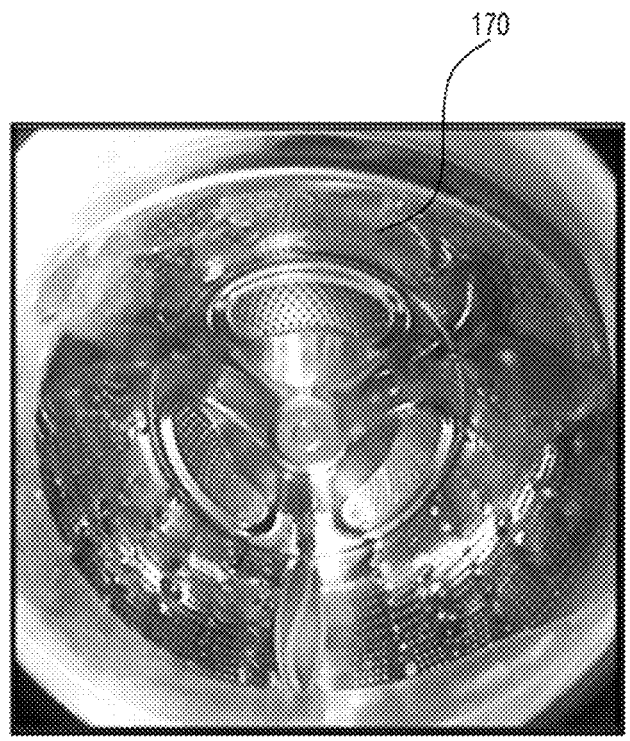
FIG. 3A is a view illustrating the inside of a container of a washing machine according to an embodiment of the present disclosure.

FIG. 3A is a view illustrating the inside of a container of a washing machine according to an embodiment of the present disclosure.

The container or washing tank 170 of the washing machine 100 may be photographed by the camera 165 with an image such as that shown in FIG. 3A. The washing tank 170 rotates during the washing, rinsing, and dehydration processes, and may have a symmetrical shape based on an axis of rotation as shown in FIG. 3A.

Furthermore, although not shown in FIG. 3A, since the washing tank 170 is surrounded by an outer tub and the washing tank 170 has a plurality of holes in the bottom and side surfaces, water entering the washing tank 170 may be delivered to the outer tub through the holes.

Due to the above features, most washing tanks 170 have repeating feature shapes.

Figure 3B:
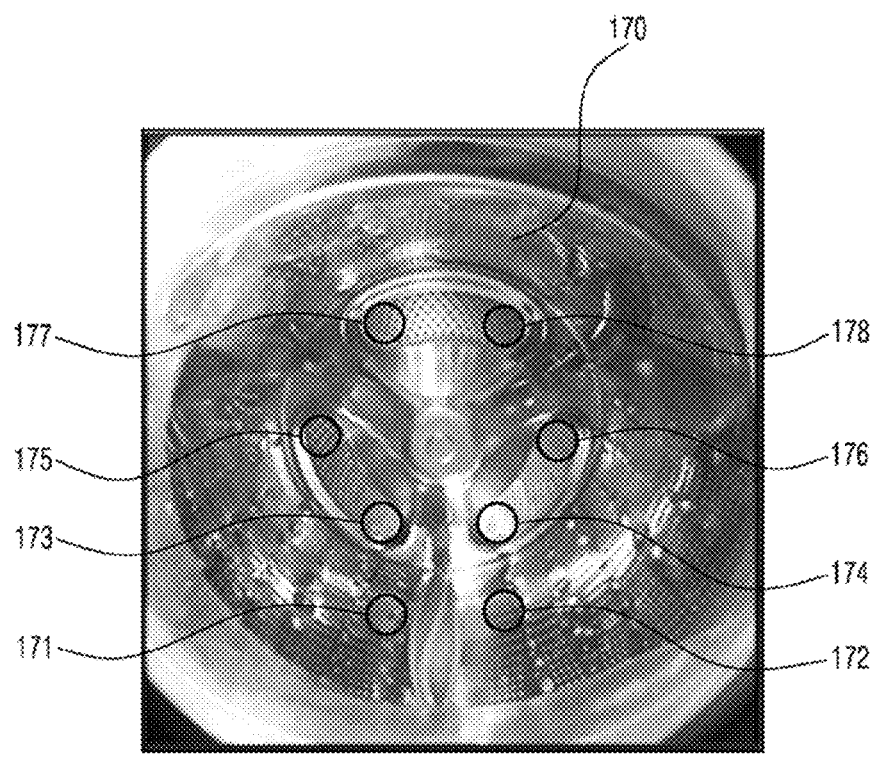
FIG. 3B is a diagram illustrating feature shapes captured in a container of a washing machine according to an embodiment of the present disclosure.

FIG. 3B is a diagram illustrating feature shapes photographed in a container of a washing machine according to an embodiment of the present disclosure.

In the image of the inside of the washing tank 170, feature shapes 171, 172, 173, 174, 175, 176, 177, and 178 can be found as described above. The feature shapes 171, 172, 173, 174, 175, 176, 177, and 178 may all be the same shape as a first shape, or only some of them may be the same shape as the first shape.

For example, some feature shapes may have the first shape and other feature shapes may have a second shape.

An image analysis neural network model may be used to identify feature shapes in the image of the inside of the washing tank 170. In one embodiment, this image analysis neural network model may be a model that is pre-trained to detect specific shapes that are repeated. In other embodiments, such image analysis neural network models may be models that are pre-trained to detect shapes specified by the developer or user.

The image analysis neural network model may extract feature shapes that are repeated in the image of the inside of the washing tank 170, and record the location and/or number of the extracted feature shapes.

Meanwhile, in FIG. 3B, as an example, eight feature shapes are visible. However, the number of feature shapes may vary depending on the shape of the washing tank 170 and the manner in which the feature shapes are photographed.

Figure 3C:
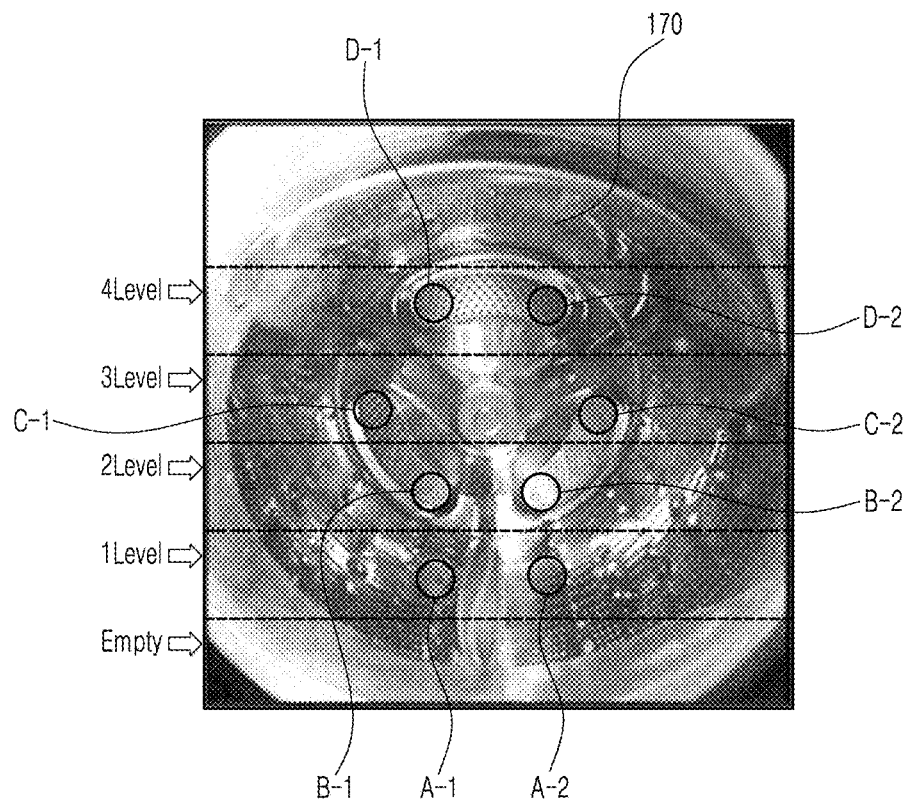
FIG. 3C is a view for explaining a correlation between feature shapes photographed in a container of a washing machine and an amount of laundry according to an embodiment of the present disclosure.

FIG. 3C is a view for explaining a correlation between feature shapes photographed in a container of a washing machine and an amount of laundry according to an embodiment of the present disclosure.

Feature shapes identified in FIG. 3B may be correlated with the amount of laundry that is the treatment target during washing. For example, as shown in FIG. 3C, eight feature shapes may be referred to as A-1, A-2, B-1, B-2, C-1, C-2, D-1, and D-2.

If all eight feature shapes are visible, the washing tank 170 may be correlated with being empty of any laundry.

If A-1 and A-2 of the eight feature shapes are not visible, the amount of laundry may be correlated with a level 1. If A-1, A-2, B-1, and B-2 are not visible, the amount of laundry may be correlated with a level 2. If A-1, A-2, B-1, B-2, C-1, and C-2 are not visible, the amount of laundry may be correlated with a level 3. If A-1, A-2, B-1, B-2, C-1, C-2, D-1, and D-2 are not visible, the amount of laundry may be correlated with a level 4. Here, as the level number is higher, the amount of laundry is greater.

The image analysis neural network model may identify a portion having a predetermined feature shape in the image of the inside of the washing tank 170, and estimate the amount of laundry according to which feature shapes of all the feature shapes are identified.

For example, if A-1, A-2, B-1, B-2, C-1, C-2, D-1, and D-2 are visible in the image of the inside of the washing tank 170, the neural network model can determine that the washing tank 170 is empty.

If B-1, B-2, C-1, C-2, D-1, and D-2 are visible in the image of the inside of the washing tank 170, the neural network model can determine that there is laundry in the washing tank 170 correlating to level 1.

If C-1, C-2, D-1, and D-2 are visible in the image of the inside of the washing tank 170, the neural network model can determine that there is laundry in the washing tank 170 correlating to level 2.

If D-1 and D-2 are visible in the image of the inside of the washing tank 170, the neural network model can determine that there is laundry in the washing tank 170 correlating to level 3.

If feature shapes are not visible in the image of the inside of the washing tank 170, the neural network model can determine that there is laundry in the washing tank 170 correlating to level 4.

In contrast, the neural network model may determine the amount of laundry based on hidden feature shapes.

Moreover, in another embodiment, the level of each laundry amount may be correlated with a plurality (for example, two) of feature shapes, and the neural network model may determine that there is laundry of the corresponding level even if only one of the plurality of feature shapes correlated with the corresponding level is not visible.

For example, when A-1 is not visible and A-2 is visible in the image of the inside of the washing tank 170, the neural network model may determine that there is laundry in the washing tank 170 correlating to level 1.

Conversely, the neural network model may be configured to determine that there is laundry of the corresponding level only if all of the plurality of feature shapes correlated with each level of laundry amount are not visible.

Meanwhile, in the above description, the image analysis and the laundry amount determination are described as being performed by the neural network model. However, in some embodiments, other types of learning models or algorithms may be used.

Figure 4A:
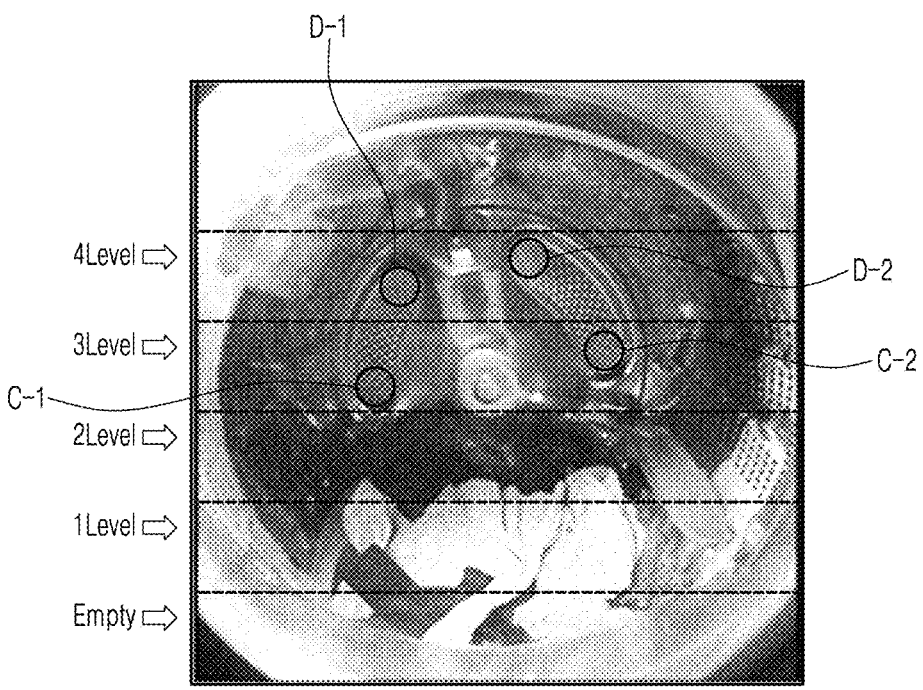
FIG. 4A is a view for explaining a case where a small amount of laundry is contained in a washing machine according to an embodiment of the present disclosure.

FIG. 4A is a view for explaining a case where a small amount of laundry is contained in a washing machine according to an embodiment of the present disclosure.

When a certain amount of laundry is contained in the washing tank 170, some feature shapes are not visible in the image of the inside of the washing tank 170 as shown in FIG. 4A. The image analysis neural network model may determine the amount of laundry based on the hidden (or blocked) feature shapes or the visible feature shapes.

In FIG. 4A, since A-1, A-2, B-1, and B-2 are blocked due to being hidden by the laundry, and only the feature shapes of C-1, C-2, D-1, and D-2 are visible, the neural network model may determine that the amount of laundry is level 2.

Figure 4B:
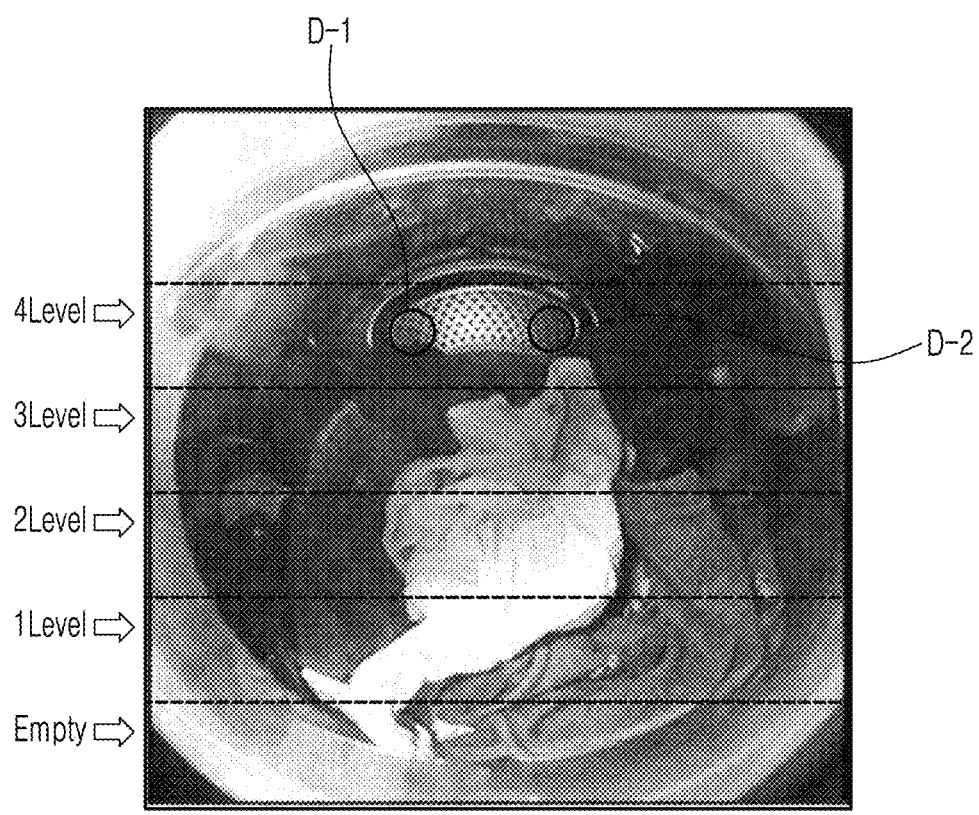
FIG. 4B is a view for explaining a case where a large amount of laundry is contained in a washing machine according to an embodiment of the present disclosure.

FIG. 4B is a view for explaining a case where a large amount of laundry is contained in a washing machine according to an embodiment of the present disclosure.

In FIG. 4B, since A-1, A-2, B-1, B-2, C-1, and C-2 are blocked due to being hidden by the laundry, and only the feature shapes of D-1 and D-2 are visible, the neural network model may determine that the amount of laundry is level 3.

The reason that the feature shapes are not visible according to the amount of laundry in FIG. 4A to FIG. 4B is that this embodiment relates to a drum washing machine, and gravity acts downward in the image.

However, when the present disclosure is applied to a top-loading washing machine, since the entire bottom surface is covered with a small amount of laundry, the feature shapes on the bottom surface as well as the feature shapes on the side surfaces are to be used to determine the amount of laundry.

Figure 5:
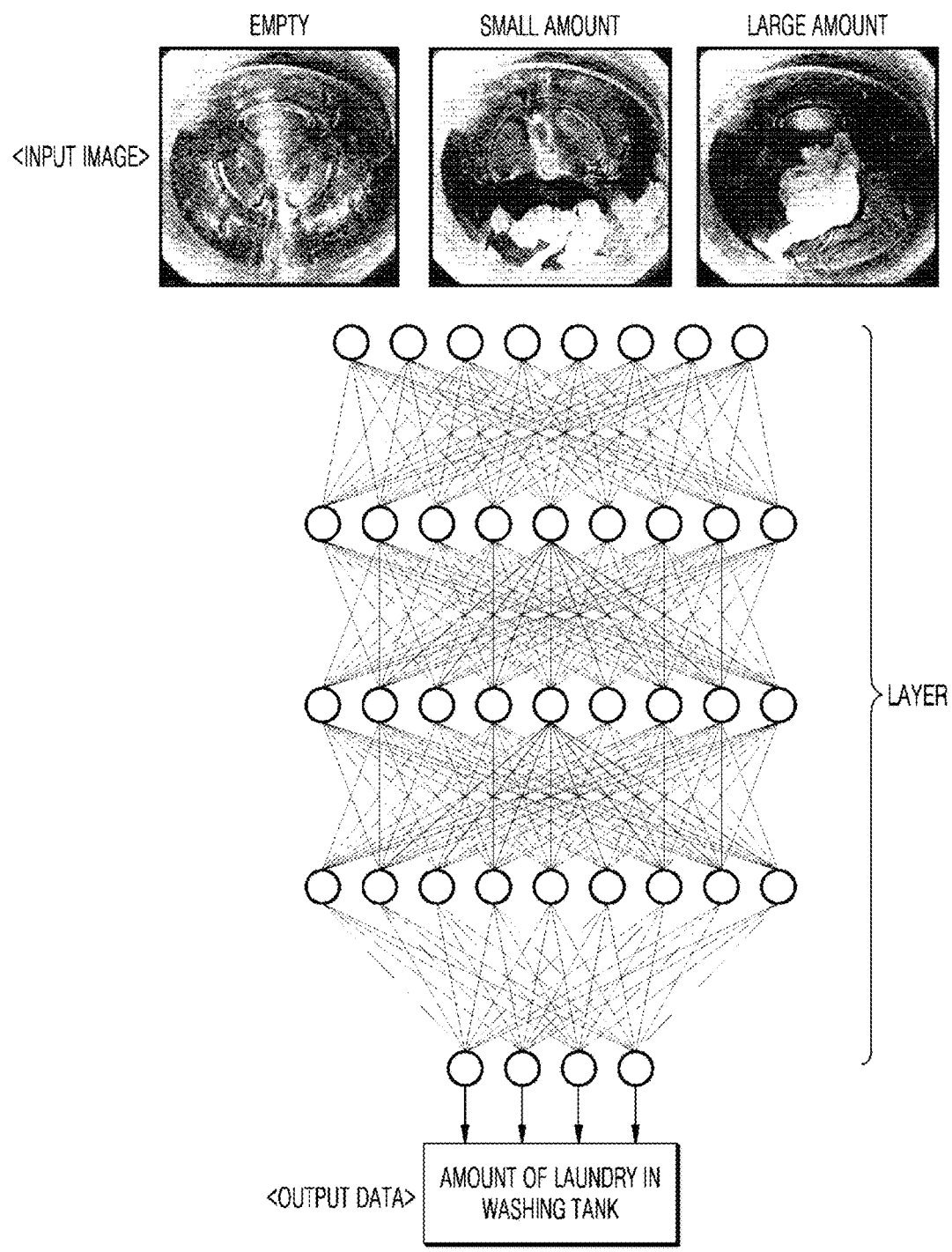
FIG. 5 is a diagram illustrating a neural network model for determining a washing amount used in a washing machine according to an embodiment of the present disclosure.

FIG. 5 is a diagram illustrating a neural network model for determining a washing amount used in a washing machine according to an embodiment of the present disclosure.

In some embodiments, in order to generate a neural network model that can analyze images to determine an amount of laundry, an initial neural network model and training data for training the neural network model can be prepared.

The neural network model that can be used here can generally be a convolutional neural network.

The training data may include an image of the inside of the washing tank 170 before laundry is put in, images of the inside of the washing tank 170 into which various amounts of laundry are put, and data labeled with the amount of laundry for each image.

Through supervised learning using such training data, the neural network model can estimate the amount of laundry in the washing tank 170 when the image of the washing tank 170 is inputted.

In another embodiment, an algorithm that can determine the amount of laundry by analyzing an image may be configured to extract feature shapes from an image of the inside of the empty washing tank 170, correlate the amount of laundry that is the treatment target with blocked or visible feature shapes, and determine the amount of laundry based on the blocked feature shapes or visible feature shapes in the image of the inside of the washing tank 170 when laundry is put in.

Meanwhile, the image analysis neural network model and algorithm may be configured to determine the amount of laundry based on the number of feature shapes identified in the image of the inside of the washing tank 170 photographed by the camera.

For example, after the laundry is put into a washing tank 170 that is set to have a total of eight feature shapes, if only four feature shapes are identified as shown in FIG. 4A, the amount of laundry may be determined to be level 2.

In another example, after the laundry is put into the washing tank 170 that is set to have a total of eight feature shapes, if only two feature shapes are identified as shown in FIG. 4B, the amount of laundry may be determined to be level 3.

Once the amount of laundry is determined in the manner as described above, the processor of the washing machine 100 may determine at least one of a water supply amount or a detergent input amount that is appropriate for the determined amount of laundry.

Figure 6:
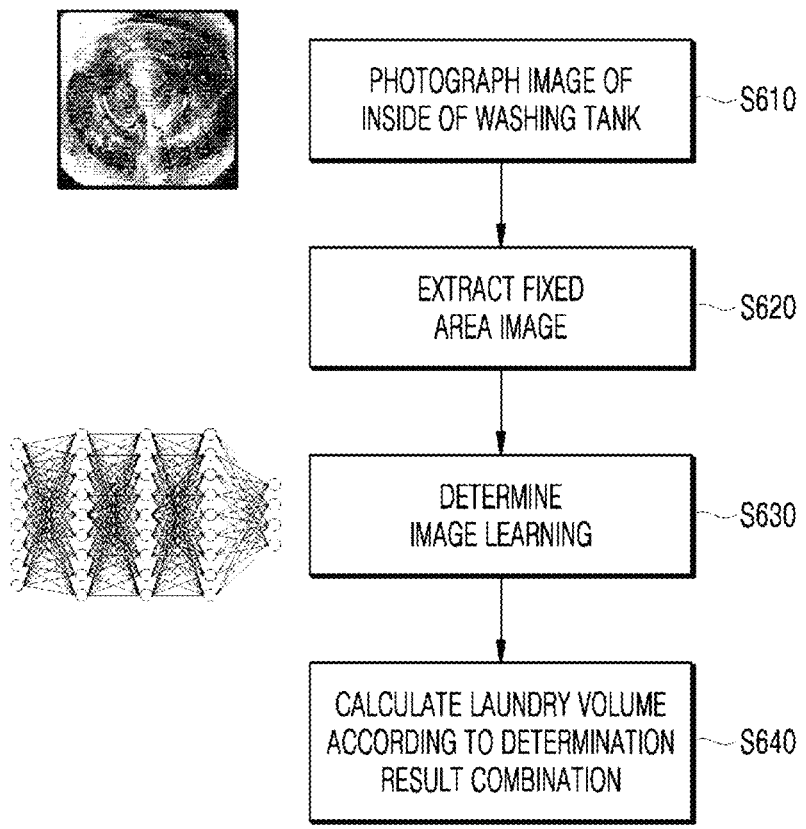
FIG. 6 is a flowchart of a process for determining a washing amount in a washing machine according to an embodiment of the present disclosure.

FIG. 6 is a flowchart of a process for determining a washing amount in a washing machine according to an embodiment of the present disclosure.

When the user wants to treat an object through the home appliance, the user opens the door installed at the inlet of the home appliance, puts in the treatment target, and closes the door. For example, in the case of a washing machine, the user approaches the washing machine with laundry, opens the door of the washing machine, puts in the laundry, and closes the door.

When the door is closed, the processor of the washing machine 100 may cause the camera 165 to photograph the inside of the washing tank 170 (S610).

In some embodiments, during the photographing of the inside of the washing tank, rotating the washing tank 170 may be performed first so that the treatment target in the washing tank is evenly distributed therein, without being unbalanced. The amount of laundry may be more accurately determined if the photographing is performed in a state in which the laundry is evenly distribute, after the rotation of the washing tank 170 is stopped.

In this case, when the door 160 is opened and then closed after a predetermined time, the processor of the washing machine 100 may take this as a signal that the laundry has been put in, and turn on a lighting for photographing the inside of the washing tank 170.

The camera 165 may photograph the inside of the washing tank 170 with the lighting turned on, thereby obtaining an image of the inside of the washing tank 170 more clearly.

Once the inside of the washing tank 170 has been photographed, the processor of the washing machine 100 may extract an image of a fixed area from the photographed image (S620).

In one example, the memory of the washing machine 100 may have an image of an empty washing tank 170 in the shape of FIG. 3C as a reference image. In this case, the processor of the washing machine 100 may extract areas which should have feature shapes (empty area, level 1 area, level 2 area, level 3 area, and level 4 area) from the image, and determine whether feature shapes are detected in each area using the image analysis neural network model stored in the memory (S630).

This determination may be made sequentially from A-1 to D-2 according to the notation in FIG. 3C.

Identification of feature shapes and detection of feature shapes by each area can be made through the pre-trained image analysis learning model (neural network model) described above.

Based on a combination of the results of the learning determination on the image, the amount of laundry (for example, volume) may be calculated (S640).

For example, if all feature shapes are found in the empty area, the processor of the washing machine 100 may determine that there is no laundry. As another example, if no feature shapes are found in the empty area and the level 1 area, and feature shapes are detected from level 2, the washing machine processor may estimate that the amount of laundry is level 2.

That is, in the laundry volume recognition method of the present disclosure, a database of images for each laundry volume level can be learned for each class, to effectively derive results regarding the laundry volume level.

The washing machine processor may determine the appropriate washing mode according to this calculation, and determine an optimal water supply amount and detergent input amount to perform the laundry cycle.

Since the laundry amount recognition method described above does not identify the laundry itself, the laundry volume recognition method recognizes the amount of laundry (treatment target) in the photographed image without separating the laundry in the washing tank (container).

Accordingly, the scheme described in this disclosure does not require the separation of the target and the background, and thus can be effectively applied even when the shape of the washing tank (the background) or the shape of the target laundry (the target) varies.

In addition, according to the method described in the present disclosure, even if there is a change in the illumination in due to diverse lighting and external environments, the recognition rate for the target is not lowered.

In addition, since most containers, such as washing tanks, have a repeating shape, according to the scheme of the present disclosure, the recognition rate is not affected by the shape change caused by the movement of the washing tank.

Figure 7:
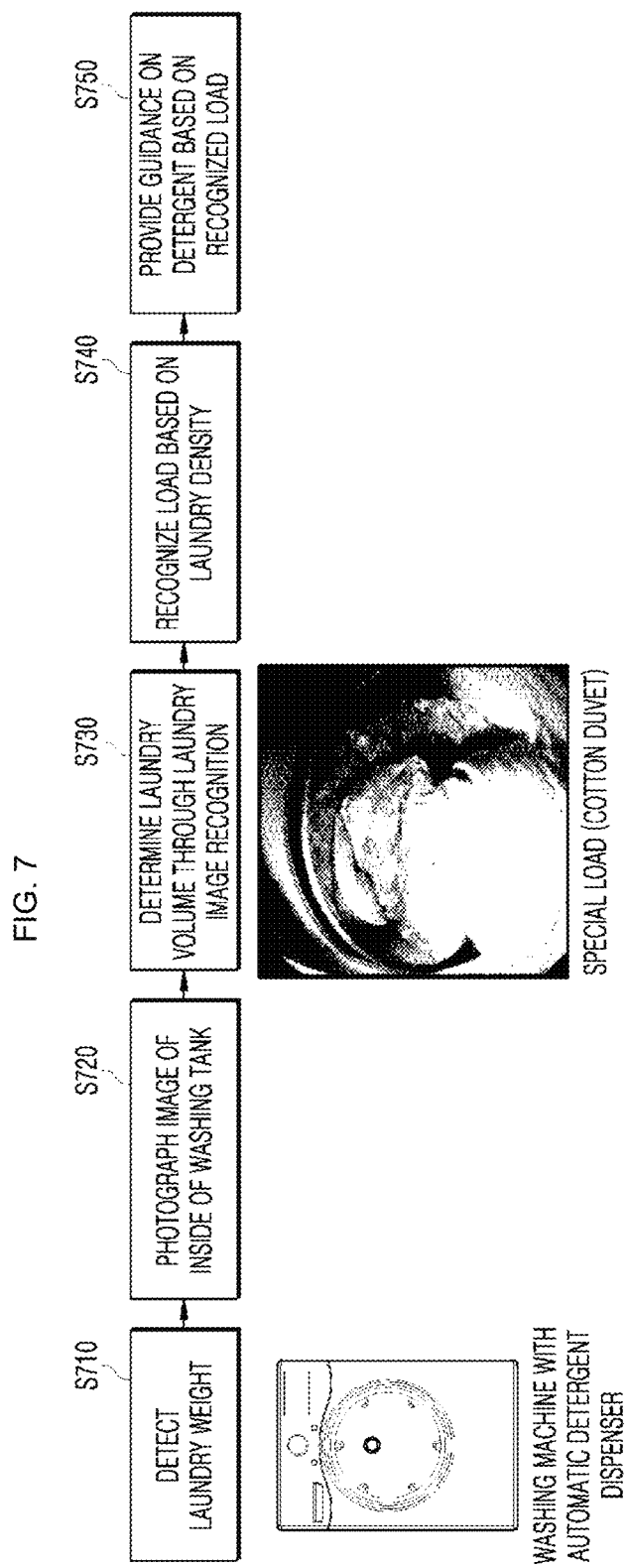
FIG. 7 is a flowchart illustrating a process for determining an attribute of laundry in a washing machine according to an embodiment of the present disclosure.

FIG. 7 is a flowchart illustrating a process for determining an attribute of laundry in a washing machine according to an embodiment of the present disclosure.

The washing machine processor may detect the weight of the laundry put in using the above-described weight sensor, after the laundry is put in and the door is closed (S710). Weight detection may be made through a load sensor connected to the washing tank 170, or may be made by sensing the torque force detected when rotating the washing tank 170 after the laundry is put in.

Before, after, or at the same time as the weight detection, the camera 165 disposed in the door 160 may photograph the inside of the washing tank 170 (S720). The volume of the laundry may be determined using an image analysis neural network model or the like in the manner described above based on the photographed image (S730).

Once the weight and volume of the laundry have been determined, the density of the laundry may be determined based thereon. If the volume of the laundry is very large but light in weight and small in density, it can be assumed that the laundry is a special laundry type, such as a cotton duvet as shown in FIG. 7.

The washing machine processor may recognize the load of the laundry having a specific attribute based on the density of the laundry (S740), and determine a suitable detergent type and detergent input amount based on this (S750).

If the washing machine 100 has an automatic detergent dispenser, the washing machine 100 may input detergent according to the determination, and if the washing machine 100 does not have an automatic detergent dispenser, the washing machine 100 may generate a visual or auditory signal to inform the user of an appropriate detergent type and detergent input amount.

While the above-described embodiments have been described based on the washing machine, the technical elements of the present disclosure described in the embodiments may be applied for the same purpose to a plurality of home appliances in which an object is put in and an operation of treating the object is performed.

The above-described embodiments of the present disclosure may be implemented in the form of a computer program which can be executed by various components on a computer and the computer program may be recorded in computer readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations may be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A home appliance, comprising:
a main body;
a container mounted within the main body to accommodate a treatment target in an interior of the container;
a camera arranged to photograph the interior of the container;
a memory including a stored neural network model trained to determine an amount of a treatment target by analyzing an image of the inside of the container acquired through the camera; and
one or more processors programmed to control an operation of the home appliance,
wherein a first processor of the one or more processors is programmed to perform an operation to determine an amount of the treatment target based on feature shapes of the container identified in an image of the interior of the container photographed by the camera through the neural network model,
wherein the amount of the treatment target is a volume of the treatment target, and
wherein the feature shapes of the container are based on holes in a bottom surface or a side surface of the container.

2. The home appliance of claim 1, wherein the first processor determines the amount of the treatment target based on a number of shapes of a first form included in the feature shapes of the container identified in the image of the interior of the container through the pre-trained neural network model.

3. The home appliance of claim 1, further comprising:
a lighting disposed to illuminate the interior of the container; and
a door configured to open and close a treatment target inlet of the container,
wherein the camera is disposed in the door.

4. The home appliance of claim 1, wherein the operation of determining the amount of the treatment target based on the feature shapes inside the container comprises operations of
extracting the feature shapes from the image of the interior of the container before the treatment target is put into the container;
correlating the amount of the treatment target with blocked feature shapes or visible feature shapes; and
determining the amount of the treatment target based on the blocked feature shapes or the visible feature shapes in the image of the interior of the container after the treatment target is put into the container.

5. The home appliance of claim 1, wherein the neural network model is pre-trained using training data comprising images of the interior of the container into which various amounts of the treatment target is put into the container and labels indicating the amount of the treatment target for each image.

6. The home appliance of claim 5, wherein the neural network model is configured to determine the amount of the treatment target using a number of blocked feature shapes or a number of visible feature shapes among the feature shapes in the container before the treatment target is put into the container.

7. The home appliance of claim 1, further comprising a weight sensor configured to detect a weight of the treatment target in the container,
   wherein the first processor is further configured to determine a density of the treatment target based on the volume of the treatment target and the weight of the treatment target detected by the weight sensor.

8. The home appliance of claim 7, wherein the first processor is further configured to:
   determine a type of the treatment target based on object recognition of an object recognition model for the image of the treatment target photographed from the camera and the density of the treatment target; and
   select a treatment mode based on the type of the treatment target.

9. The home appliance of claim 1, wherein the first processor is further configured to determine at least one of a water supply amount or a detergent input amount based on the amount of the treatment target.

\* \* \* \* \*